US011905141B2

(12) United States Patent
Antonio Da Silva et al.

(10) Patent No.: US 11,905,141 B2
(45) Date of Patent: Feb. 20, 2024

(54) ELEVATOR CAR PIVOTABLE BALUSTRADE AND MAINTENANCE METHOD FOR AN ELEVATOR

(71) Applicant: Inventio AG, Hergiswil (CH)

(72) Inventors: Diego Antonio Da Silva, Sao Paulo (BR); Carlos Atsushi Kotsubo, Sao Paulo (BR); Jonas Da Silva Nunes, Mogi das Cruzes (BR); Carlos Fernando Demattio Johansen, São Paulo (BR); Dario Jesse Rosa, Sao Paulo (BR); Roberto Katsutoshi Tahara, Sao Paulo (BR); Adriano Koji Yokomizo, São Paulo (BR); Murilo Lopes Santos, Sao Paulo (BR); Sergio Luis De Castro Bassani, Sao Paulo (BR); Louelson Dagner Pimenta Silva, Sao Paulo (BR); Rafael Tomiatto Tenguam, Sao Paulo (BR)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/757,248

(22) PCT Filed: Nov. 27, 2020

(86) PCT No.: PCT/EP2020/083672
§ 371 (c)(1),
(2) Date: Jun. 13, 2022

(87) PCT Pub. No.: WO2021/121904
PCT Pub. Date: Jun. 24, 2021

(65) Prior Publication Data

US 2023/0002191 A1 Jan. 5, 2023

(30) Foreign Application Priority Data

Dec. 20, 2019 (EP) .................................... 19218489

(51) Int. Cl.
*B66B 5/00* (2006.01)

(52) U.S. Cl.
CPC ................................. *B66B 5/0081* (2013.01)

(58) Field of Classification Search
CPC .................................................... B66B 5/0081
See application file for complete search history.

(56) References Cited

U.S. PATENT DOCUMENTS 6,543,584 B1 * 4/2003 Miyakoshi ............ B66B 5/0081
187/401
6,830,127 B2 * 12/2004 Johnson .................. E02D 29/12
182/128

(Continued)

FOREIGN PATENT DOCUMENTS

DE 102005002607 A1 8/2006
DE 112016007352 T5 6/2019

(Continued)

*Primary Examiner* — Michael A Riegelman
(74) *Attorney, Agent, or Firm* — William J. Clemens; Shumaker, Loop & Kendrick, LLP

(57) ABSTRACT

An elevator includes a car movable in an elevator shaft and a counterweight movable together with the car in the elevator shaft in a direction of movement opposite to the direction of movement of the car. The car has a car roof and a balustrade arranged on the car roof at a side of the car facing toward the counterweight. The balustrade can be pivoted between a first fall protection position and a second fall protection position. In each of these fall protection positions the balustrade can be secured in order to prevent unintended movement of the balustrade. In the first fall protection position, the balustrade has an inclined orientation. In the second fall protection position, the balustrade has a vertical orientation.

14 Claims, 5 Drawing Sheets

(56) References Cited

U.S. PATENT DOCUMENTS

| | | | | |
|---|---|---|---|---|
| 7,510,056 | B2 * | 3/2009 | Bonatre | B66B 5/0081 187/401 |
| 8,365,870 | B2 * | 2/2013 | Sirigu | B66B 5/0087 187/391 |
| 9,764,925 | B2 * | 9/2017 | Cheng | B66B 11/0246 |
| 10,233,054 | B2 * | 3/2019 | Ishiguro | E06B 11/022 |
| 10,836,605 | B2 * | 11/2020 | Roussel | B66B 5/0081 |
| 11,174,124 | B2 * | 11/2021 | Schuler | B66B 11/0226 |
| 2005/0230194 | A1 * | 10/2005 | Nakamura | B66B 5/0081 187/401 |
| 2008/0217113 | A1 * | 9/2008 | Bonatre | B66B 5/0081 187/401 |
| 2008/0245619 | A1 * | 10/2008 | Monzon-Simon | B66B 5/0081 187/393 |
| 2012/0164928 | A1 * | 6/2012 | Wuest | B66B 11/024 454/68 |
| 2013/0092479 | A1 | 4/2013 | Bloch | |
| 2018/0002139 | A1 * | 1/2018 | Stepp | B66B 11/0226 |
| 2018/0362298 | A1 * | 12/2018 | Roussel | B66B 5/0081 |
| 2019/0241399 | A1 * | 8/2019 | Kattainen | B66B 5/0081 |
| 2019/0256322 | A1 * | 8/2019 | Kattainen | B66B 11/0246 |
| 2019/0256323 | A1 * | 8/2019 | Schuler | B66B 5/0081 |
| 2022/0009744 | A1 * | 1/2022 | Hugel | B66B 5/0081 |
| 2023/0002191 | A1 * | 1/2023 | Antonio Da Silva | B66B 5/0081 |

FOREIGN PATENT DOCUMENTS

| | | | | |
|---|---|---|---|---|
| EP | 0922663 | B1 | 6/2000 | |
| EP | 2138440 | A1 | 12/2009 | |
| EP | 3315445 | A1 * | 5/2018 | B66B 1/28 |
| JP | 2010058861 | A | 3/2010 | |
| JP | 2011126706 | A | 6/2011 | |

* cited by examiner

A - A

ELEVATOR CAR PIVOTABLE BALUSTRADE AND MAINTENANCE METHOD FOR AN ELEVATOR

FIELD

The invention relates to an elevator car pivotable balustrade and also to a maintenance method for an elevator.

BACKGROUND

Elevators for conveying people and goods contain cars that are movable up and down, in the vertical direction, in an elevator shaft. The cars can be moved by a drive unit using suspension means, for example in the form of suspension cables or suspension belts. The elevator further comprising a counterweight connected with the car by way of the suspension means, the car moves in the elevator shaft in a direction of movement opposite to the direction of movement of the car. For particular situations, it may be necessary for a person to access a roof of the elevator car in order to carry out work (e.g. maintenance work) therefrom. It is necessary, for this purpose, for people to be able to safely spend time on the elevator car roof. If, for example, the width of a gap between the car and an adjacent shaft wall is too large, balustrades have to be installed on the car roof in order to protect against falls. Balustrades of this kind on elevator car roofs have per se long been known and have been in common use. By way of example, a car for an elevator with a balustrade is known from US 2013/0092479 A1. The balustrade comprises horizontally extending handrails which connect posts with each other, wherein the posts extend vertically and are fixed to the roof of the elevator car.

When inspection or maintenance work is carried out on the elevator, the maintenance personnel may have to check the interior of the elevator shaft from the roof of the car. The inspection in that case relates to, for example, the shaft doors, the lighting system, guides for the elevator car and/or the counterweight, sensors, cables and/or other support means, and so forth. The maintenance personnel in that case sets the elevator installation into a so-called inspection mode. The maintenance personnel can then move the car by means of e.g. a control key ('travel button'). In the inspection mode the car is thus manually controlled and the maintenance personnel has to constantly actuate the travel button so that the elevator car moves. During this movement of the car the car passes—just as in normal operation—the counterweight which is moving in opposite direction. The movement of the car for inspection and maintenance purposes is also known as inspection run. The car and the counterweight usually pass at approximately half the height of the elevator shaft and in that case move very closely past one another. The passing of car and counterweight is potentially dangerous for a person present on the car roof, since in the event of inattention there is a risk that the person collides with the counterweight. This applies in the individual case particularly to any other person who may be travelling therewith and who may lean over the balustrade while another person actuates the travel button.

Further, the counterweight normally is guided along counterweight guide rails. The counterweight guide rails may be mounted on omega-shaped brackets whereas the omega forms a hollow space through which the counterweight can be passed. Such brackets are mounted more or less over the entire shaft height and constitute a danger for a person present on the car roof during an inspection run.

For some time, so-called engine-room-less elevators have enjoyed increasing popularity. These are elevator installations in which the drive units are arranged no longer in a separate engine room, but in the elevator shaft. The drive unit is in that case usually positioned at the top, i.e. in the region of the shaft head of the elevator shaft. The drive unit may project partly beyond the car. In this case, the balustrade would be arranged on the car roof to be offset inwardly to such an extent from the roof edge that it is arranged, apart from the overlap region or projected shadow, between drive and car roof. However, there might be a certain risk of injury when, in an inspection run, a person leaning over the balustrade during driving up the car in the region of the shaft head.

SUMMARY

An object of the present invention is to provide an elevator and a method which reduces the above-outlined risk of injury to a person on a car roof during an inspection run.

This object is achieved according to the invention with an elevator that comprises a car movable in an elevator shaft and a counterweight movable together with the car in the elevator shaft in a direction of movement opposite to the direction of movement of the car. The car comprises a car roof and a balustrade arranged on the car roof at a side of the car facing toward the counterweight. The balustrade, which is a pivotable balustrade, is or can be secured in a first fall protection position, in which first fall protection position the balustrade has an inclined orientation. In this first fall protection position, the balustrade is positioned at an inclination which reduces the accessible area for the maintenance personnel, or in other words, the inwardly inclined balustrade results in that the horizontal distance of the handrail with respect to the counterweight is increased. This arrangement reduces the risk of injury to a person on a car roof during an inspection run.

The balustrade may be designed such that it can be pivoted between the first fall protection position and a second fall protection position. The balustrade can be secured in both fall protection positions in order to prevent unintended movement of the balustrade, e.g. when a person pushes the handrail of the balustrade. In the first fall protection position, the balustrade has the inclined orientation and, in the second fall protection position, the balustrade has a vertical orientation.

The first fall protection position in which the balustrade has an inclined orientation may be allocated with a normal operation mode of the elevator. In the normal operation mode the car is doing normal runs. This normal run is understood to be the typical operation of the elevator when requested by passengers. The first fall protection position may be further allocated with a maintenance mode of the elevator. In the maintenance mode the maintenance personnel can enter or step on the car roof and execute maintenance works. The technician on the car roof may modify, repair or replace various components of the elevator. In the maintenance mode it would be possible to do also inspection runs. When an inspection run takes place and when a person impinges the inclined balustrade, the balustrade might be pivoted from the first fall protection position to the second fall protection position. In this case, e.g. when the balustrade leaves or has been released from the first fall protection position, the moving car may immediately stop.

However, other modes of the elevator comprising the balustrade which can be pivoted between the first and the second fall protection positions would also be conceivable.

For example, in another mode of the elevator, the second fall protection position may be allocated with the normal mode and a normal maintenance mode of the elevator. As opposed thereto, maintenance personnel may have to do inspection runs. The first fall protection position may be allocated with an inspection run mode of the elevator for executing inspection runs. So, the maintenance personnel must bring the balustrade from the vertical fall protection position to the inclined fall protection position before an inspection run can be started.

The balustrade may comprise a handrail. The handrail defines a horizontal upside completion of the balustrade. The balustrade may further comprise a central horizontal bar. Furthermore, a baseboard may be provided in the region of the upper face of the roof. The balustrade may comprise two vertical posts. The handrail, the bar and the baseboard connect the posts with each another.

When the balustrade is in the first fall protection position, the balustrade is positioned at an inclination which reduces the accessible area for the maintenance personnel, or in other words, the inwardly inclined balustrade results in that the horizontal distance of the handrail with respect to the counterweight is increased. Due to this fact, the risk of injury to a person on a car roof during an inspection run can thus be effectively excluded.

The joints for the pivotable movement of the balustrade may, when the balustrade is configured being pivotable as a whole, be mounted on the car roof. However, it would be conceivable that the balustrade is configured as a two-part balustrade having a lower stationary balustrade part and an upper movable balustrade part. In the latter case the joints would be arranged at the interface region between the two balustrade parts.

In a first embodiment, the balustrade, when in the first fall protection position, is inclined at an angle of 30° to 80°, preferably 45° to 70° and particularly preferably 50° to 60° relative to the horizontal plane. At this inclination, a stable balustrade can be provided which safely protects persons against falls.

The elevator may comprise a locking mechanism for securing the balustrade in the first fall protection position for a stable and safe positioning. An unintended movement of the balustrade when a person pushes the handrail of the balustrade can thus be easily be prevented. Of course, the elevator may alternatively or additionally also comprise a locking mechanism for securing the balustrade in the second fall protection position.

In an embodiment, the locking mechanism for securing the balustrade in the first fall protection position or in the second fall protection position comprises a locking notch and a corresponding locking pin unit. Thereby, an advantageous handling of the balustrade can be ensured.

The locking mechanism may be designed such that the balustrade is locked by a latching connection or by another connection between the movable balustrade and a stationary counterpart, which is arranged on the car roof, in response to a pivot movement of the balustrade to establish the inclined first fall protection position or the vertical second fall protection position.

The car comprises perpendicular sides adjoining the side of the car facing toward the counterweight. At these perpendicular sides lateral balustrades may be arranged on the car roof. The lateral balustrades can be stationary balustrades which are fixedly mounted on the car roof.

In order the balustrade can be secured in the first fall protection position, at least one of and preferably both of the lateral balustrades may define a stationary counterpart for the connection with respect to the movable balustrade in the inclined first fall protection position.

In a preferred embodiment, at least one connecting rail may be arranged between the balustrade and a stationary supporting element preferably formed by at least one vertical post, the connecting rail being connected to the balustrade and the supporting element in a pivotable manner. The supporting element can be a standalone supporting element. Particularly preferably, the supporting element may be a vertical post of a neighboring or adjoining lateral balustrade.

The at least one connecting rail can have two lever components coupled via a hinge. The connecting rail may be designed such that when the two lever components are positioned in a straight line the first inclined fall protection position can be easily secured.

The elevator may comprise at least one safety switch or sensor which is able to detect whether the balustrade rests or is properly engaged in the first fall protection position. This will ensure that only inspection runs would be possible when the balustrade is in the first fall protection position. It can be particularly advantageous, when the elevator comprise safety switches or sensors which are able to detect whether the balustrade properly assumes one of the fall protection positions.

The safety switches or sensors may be connected to a processing unit, particularly a processing unit included in the elevator control device; the elevator control device being intended for controlling and/or monitoring the movement of the elevator car. The elevator comprises the drive unit for moving or displacing the car and the elevator control device for controlling an operation of the drive unit. It would further be conceivable that above mentioned at least one safety switch or sensor may be integrated in a safety circuit of the elevator, whereas the safety circuit, inter alia, activates a drive brake in the case of an emergency.

For example, with respect to the first mentioned elevator mode, when the balustrade is in the first fall protection position, the associated safety switch is closed. The car can do normal runs in the normal operation mode and inspection runs in the maintenance mode. When the balustrade is released from the first fall protection position, the safety switch is actuated and thus opened, then the elevator control device prevents the drive from moving the car or an emergency stop is triggered via the safety circuit.

A further aspect of the invention may relate to a balustrade for a roof of an elevator car of an elevator preferably according to the foregoing description.

Further individual features and advantages of the invention will become apparent from the following description of exemplary embodiments. Advantageous embodiments of the invention will be described with reference to the enclosed drawings. However, neither the drawings nor the description shall be interpreted as limiting the invention. The figures are only schematic and not to scale. Same reference signs refer to same or similar features.

DETAILED DESCRIPTION

Figure 1:
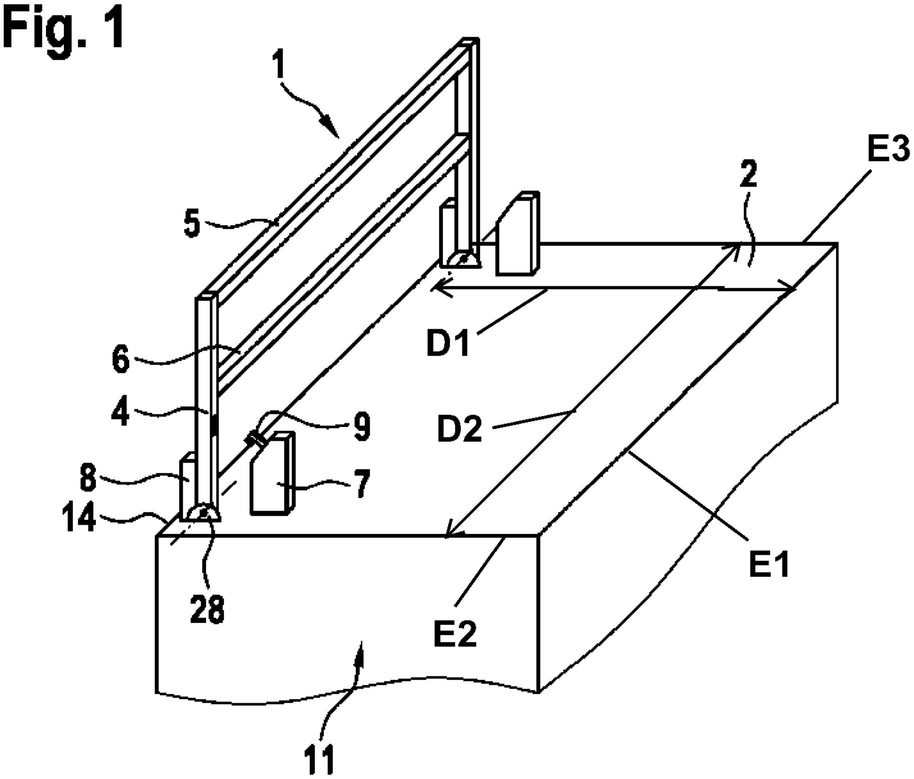
FIG. 1 shows a perspective view of an elevator car with a balustrade in a vertical fall protection position.

FIG. 1 shows an upper part of an elevator car 11 of an elevator for conveying people and goods vertically up and down. The car 11 has a car roof 2 on which a balustrade 1 is arranged. The balustrade 1 comprises an upper handrail 5 and a central bar 6 arranged approximately at half height. The balustrade 1, however, may further comprise a toeboard on the floor of the car roof 2. Two vertical posts 4 are provided for purposes of supporting the handrail 5 and the central bar 6.

The balustrade 1 is arranged on the car roof adjacent an edge 14 of the car roof 2 at a side of the car 11 facing toward a counterweight (not shown here). The posts 4 are connected to the car roof 2 via joints 28 that enable the balustrade 1 being pivotably attached to the roof. The movable balustrade can be pivoted about a horizontal rotation axis between two positions.

Figure 2:
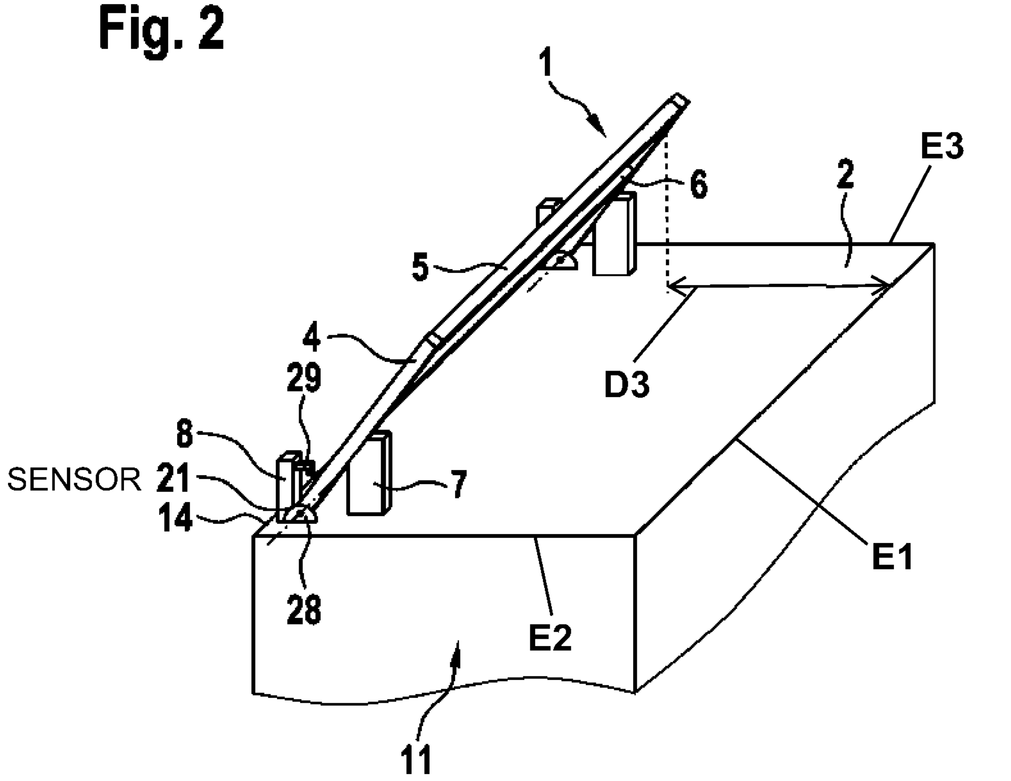
FIG. 2 shows the car of FIG. 1 with the balustrade in an inclined fall protection position.

In FIG. 2 the balustrade 1 has an inclined orientation which may corresponds to a first fall protection position. In a preferred mode for the elevator, the first fall protection position is allocated with a normal operation mode of the elevator. In the normal operation mode the car 11 can do normal runs. The first fall protection position is further allocated with a maintenance mode of the elevator. In the maintenance mode it would be possible to do also inspection runs. When an inspection run takes place and when a person hits the inclined balustrade 1, the balustrade makes a pivotal movement in a direction to the second fall protection position. This pivotal movement of the balustrade 1 can be monitored by a switch or a sensor 21 at the stop element 8 and a controller (not shown here) may immediately stop the car.

In an alternative mode for the elevator 1, the inclined balustrade 1 as shown in FIG. 2 is associated with an inspection run mode. In FIG. 1 the balustrade 1 has a vertical orientation which corresponds to a second fall protection position. In this case, the second fall protection position is associated with the normal mode of the elevator. FIG. 1 shows the accessible area on the car roof 2 extends from a vertical plane of the balustrade 1 to an opposite edge El of the car 11 for a first distance D1 and extends in a transverse direction for a second distance D2 between opposite edges E2, E3 of the car. When maintenance personnel is present on the car roof 2 which needs to do an inspection run the balustrade 1 has to be pivoted from the second fall protection position in a first fall protection position. FIG. 2 refers to this first fall protection position. In the first fall protection position the balustrade 1 is positioned at an inclination which reduces the accessible area on the car roof 2. The reduced accessible area extends from a vertical plane (indicated by the dashed line) that includes the handrail 5 to the edge El for a third distance D3 that is shorter than the second distance D2. Thus, the horizontal distance of the handrail 5 with respect to obstacles in the shaft such as the conteractive moving counterweight, omega shaped brackets and/or the drive unit arranged at the shaft head is increased so persons on the car roof can safely perform inspection runs (cf. FIG. 3). In the example of embodiment in accordance with FIG. 2, the balustrade 1 is inclined at an angle of approx. 60° relative to a horizontal plane.

In the first fall protection position, the posts 4 of the balustrade 1 rest on stop elements 7 which stop the pivot movement of the balustrade 1. A locking mechanism for securing the balustrade 1 in the first fall protection position comprises a latch 9 which can be seen in FIG. 1. The latch 9 is associated to one of the stop elements 7 and can be brought into engagement with the respective post 4. So, the balustrade 1 can be locked by a latching connection between the movable balustrade 1 and the stationary counterpart formed by the stop element 7 in response to the pivot movement of the balustrade 1 to establish the inclined first fall protection position. A similar locking mechanism is foreseen for securing the balustrade 1 in the second fall protection position. With respect to the second fall protection position, two stop elements 8 formed by short vertical pillars are fixedly mounted on the car roof. One of these stop elements 8 comprise a latch 29 which can be brought into engagement with the respective post 4 when doing the return pivot movement of the balustrade 1 for creating the second fall protection position.

Figure 3:
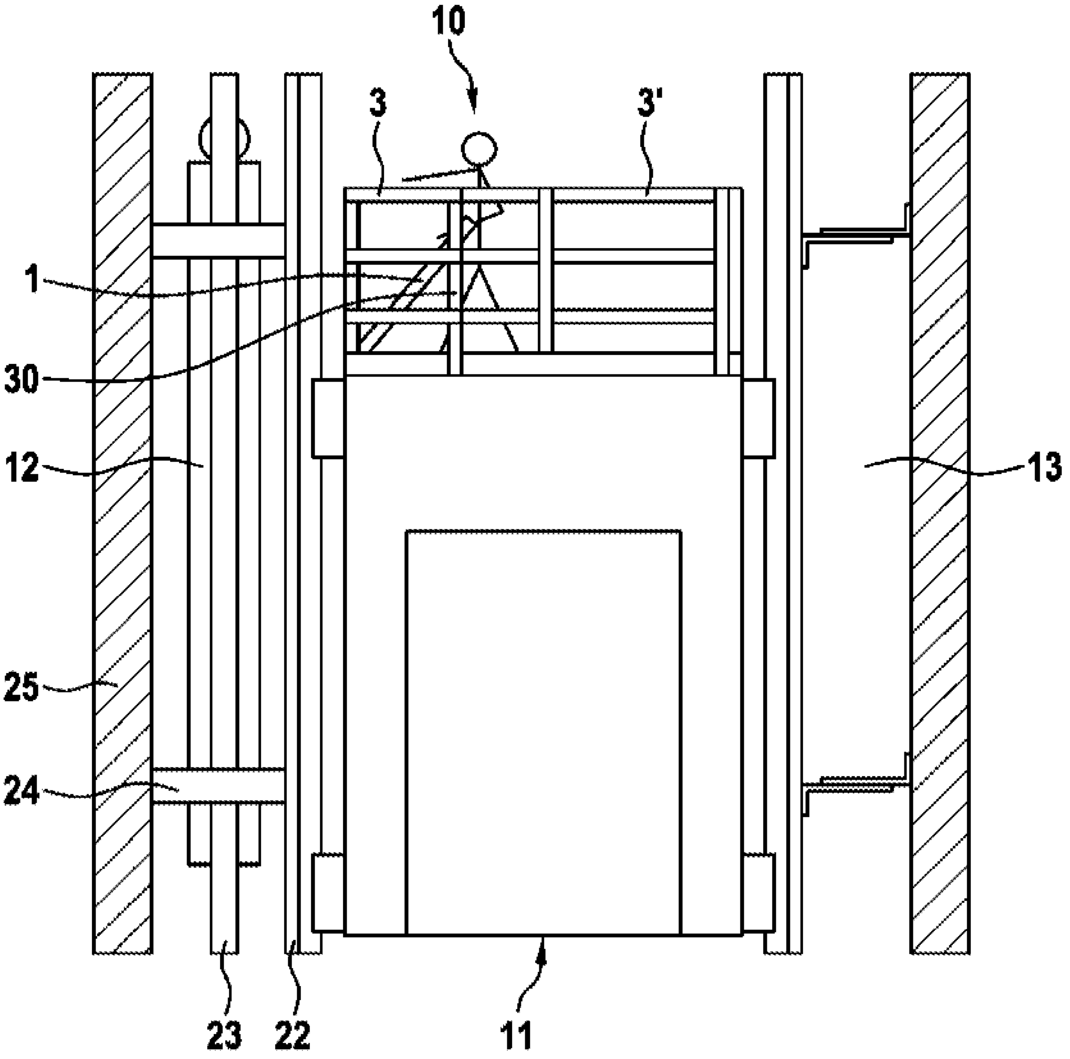
FIG. 3 shows an elevator during an inspection run in a side view with a balustrade being in an inclined fall protection position.
Figure 4:
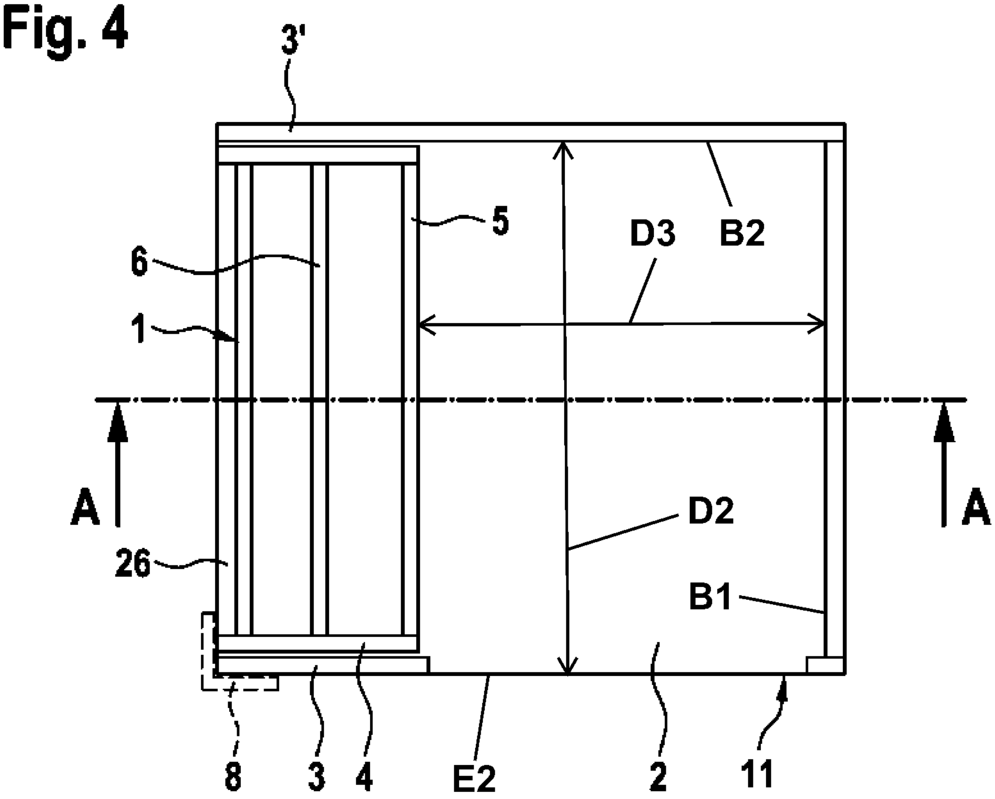
FIG. 4 shows a top view of the elevator car of the elevator of FIG. 3.
Figure 5:
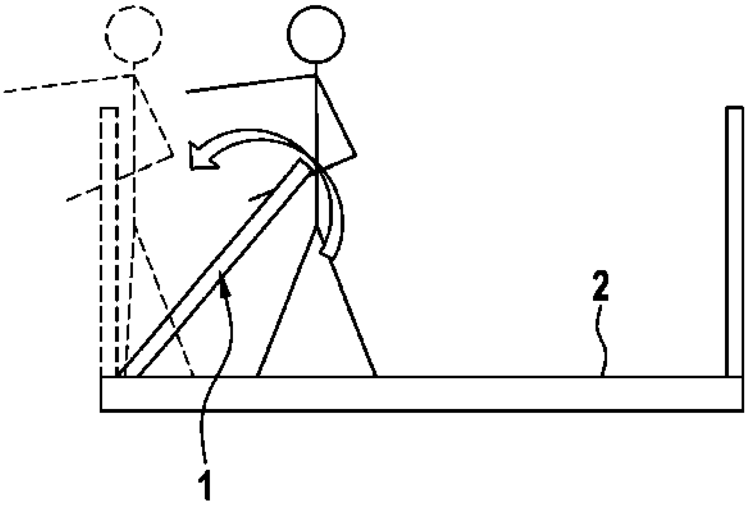
FIG. 5 shows a side view of the elevator car of the elevator of FIG. 3 along line A-A in FIG. 4.

Another embodiment of a movable balustrade 1 providing on the one side a vertical fall protection positions and on the other side an inclined fall protection positions is shown in FIGS. 3 to 5. FIG. 3 also shows some details with respect to the elevator system. The elevator denoted by 10 features the car 11 that can be moved up and down for purposes of transporting persons or goods. The movement of the car 11 takes place, for example, by way of suspension means (not shown here), which support the car 11, or, on which the car 11 is suspended. The suspension means can, for example, be one or a plurality of supporting cables or supporting belts. An elevator shaft, in which the elevator car 11 travels, is designated as 13. The car 11 is guided along car guide rails 22. The counterweight 12 is guided along counterweight guide rails 23. The counterweight guide rails 23 are mounted, for example, on omega-shaped brackets 24 attached to the shaft wall 25. At the side of the car 11 facing toward the counterweight 12 above-named movable balustrade 1 is arranged.

In FIG. 3 the balustrade 1 is in the first fall protection position in which it is positioned at an inclination. For securing the balustrade 1 in the inclined first fall protection a post 30 of a neighboring lateral stationary balustrade 3 may be used.

From FIG. 4 it can be seen that the balustrade 1 comprises a handrail 5, a central bar 6 and a toeboard 26. The movable balustrade 1 is arranged between two lateral balustrades 3, 3'. These balustrades 3, 3' are stationary balustrades and may be used for securing the two fall protection positions of balustrade 1. Additionally or alternatively, separate stop elements or supporting elements for securing one of or both fall protection positions may be used. FIG. 4 allusively features a stop element 8 for supporting and securing the balustrade 1 in the vertical fall protection position. The reduced accessible area of the car roof 2 extends between the handrail 5 and a lateral balustrade B1 for the distance D3 and between the edge E2 of the car 11 and another lateral balustrade B2 for the distance D2.

FIG. 5 shows the car roof 2 with the movable balustrade 1 along the section line A-A in FIG. 4. For a better overview the lateral balustrades are not shown here. In the example of the first embodiment, the balustrade 1, when in the first fall protection position as in FIG. 5, is inclined at an angle of approx. 45°. The balustrade 1 is dimensioned such that its height is approx. 70 cm; so the balustrade 1 fulfills the height requirement of elevator regulations such as for example the European Standard EN81-21.

Figure 6:
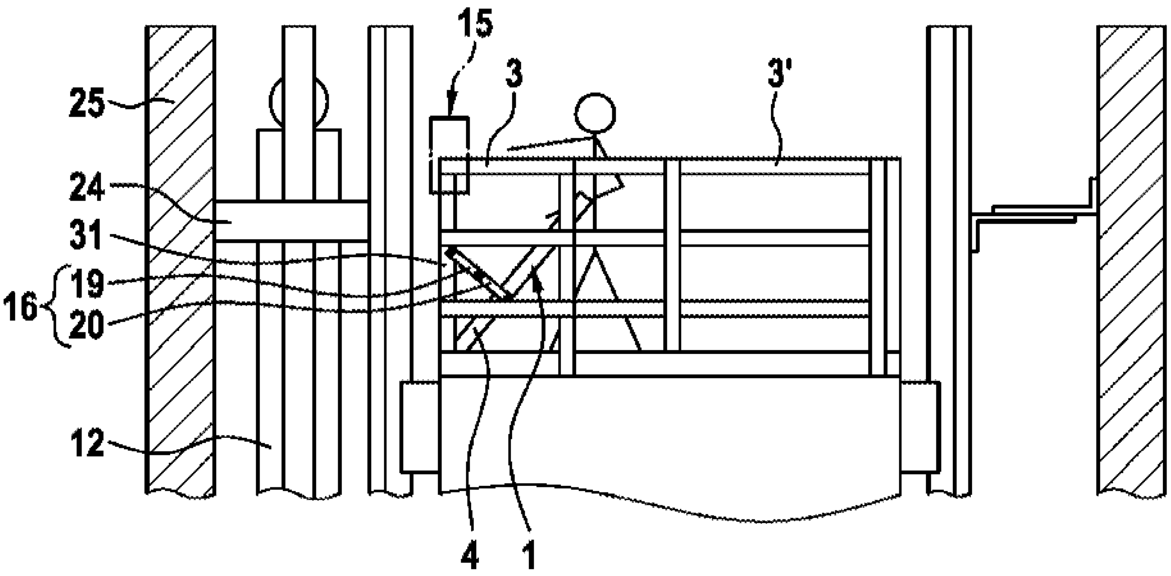
FIG. 6 shows a variation of the elevator of FIG. 3.
Figure 7:
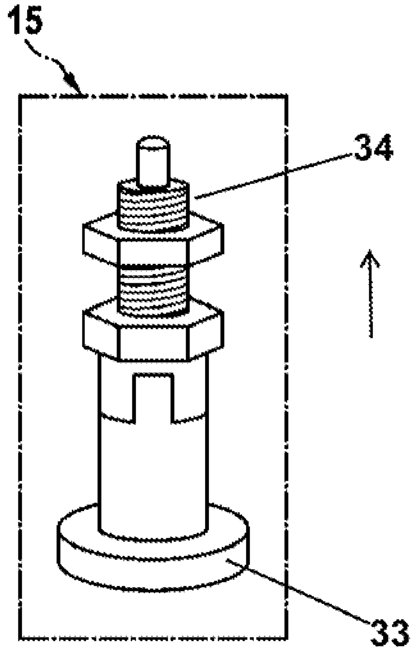
FIG. 7 shows a perspective and enlarged view of a locking pin for securing the balustrade in one of the fall protection positions.

The movable balustrade according to FIG. 6 can, for securing the vertical fall protection position, be detachably connected with front posts 31 of the lateral balustrades 3, 3' using a locking mechanism comprising a locking notch and a corresponding locking pin unit 15, whereas the latter, by way of example, can be seen in FIG. 7 in detail. The locking notch may be associated with the post 31; the corresponding locking pin unit 15 may be associated with the balustrade 1. Alternatively, the locking notch may be associated with the balustrade 1, and the corresponding locking pin unit 15 may be associated with the post 31. The locking pin unit 15 comprises a pin 34 which is biased into a closed position under a spring biasing force. The pin can be brought into an open position by pulling a grip 33. The respective opening movement is indicated by an arrow.

At least one connecting rail 16 and preferably two connecting rails 16 on each lateral side is or are arranged between the vertical post 31 defining a stationary supporting element on the one side and the balustrade 1 on the other side. Thereby, the connecting rail or rails is or are connected to the balustrade 1 and the post or posts 31 in a pivotable manner. Each connecting rail 16 has two lever components 19, 20 coupled via a hinge.

Figure 8:
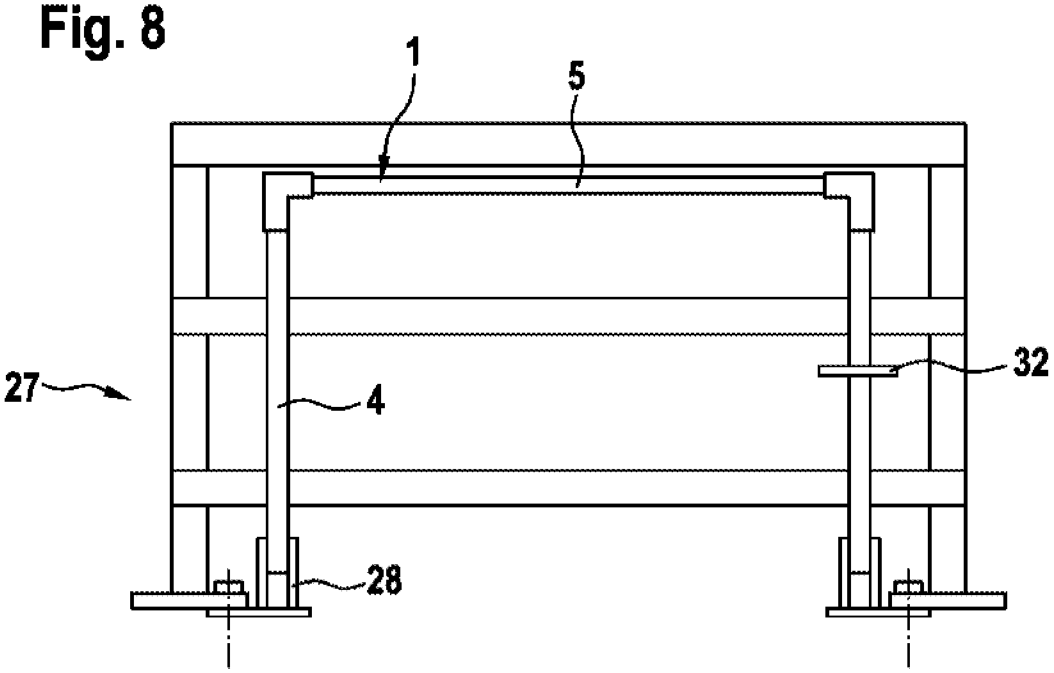
FIG. 8 shows a retrofitted movable balustrade behind an existing conventional stationary balustrade in a frontal view.
Figure 9:
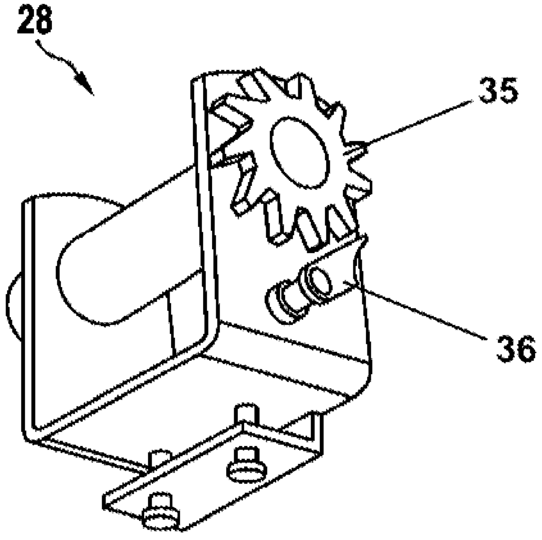
FIG. 9 shows a perspective and enlarged view of a joint for the movable balustrade of FIG. 8.

FIG. 8 shows a movable balustrade 1 providing a vertical fall protection position and an inclined fall protection position, whereas the balustrade 1 is arranged behind a stationary balustrade 27. The stationary balustrade 27 may be a preexisting balustrade 27 mounted on the car roof. So, the movable balustrade 1 can favorably be implemented in a retrofit. The balustrade 1 is connected to the car roof 2 via joints 28 enabling the balustrade 1 to be pivotably attached to the car roof. A handle 32 is provided on one of the vertical posts 4 to assist in moving the balustrade 1 between the positions. In the example of the embodiment in accordance with FIG. 8, the joints 28 are designed such that the function of securing the balustrade in a certain pivoted position, especially in the first fall protection position and in the second fall protection position, can be integrated in these joints. For this specific purpose, the joints 28 comprise a ratchet mechanism preventing the balustrade being unintendedly pivoted in the opposite direction back towards the counterweight (not shown). FIG. 9 shows some technical details of such a ratchet mechanism based joint 28 for the balustrade 1. The ratchet mechanism comprises a ratchet wheel 35 and a pawl 36, wherein rotation of the ratchet wheel 35 in one direction can be blocked by the pawl 36.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator including a car movable in an elevator shaft and a counterweight movable together with the car in the elevator shaft in a direction of movement opposite to a direction of movement of the car, the car having a car roof and a balustrade arranged on the car roof at a side of the car facing toward the counterweight, the balustrade comprising:

a balustrade pivotably attached to the car roof on an axis adjacent an edge of the car roof;

wherein the balustrade is pivotable about the axis adjacent the edge of the car roof from a vertical orientation to a first fall protection position having an inclined orientation relative to the car roof that angles the balustrade away from the edge of the car roof and reduces an accessible area of the car roof; and wherein the balustrade is securable in the first fall protection position.

2. The elevator according to claim 1 wherein the balustrade is pivotable between the first fall protection position and a second fall protection position, the balustrade being securable in the second fall protection position, wherein unintended movement of the balustrade is prevented when the balustrade is secured in either of the first and second fall protection positions, and the balustrade has the vertical orientation in the second fall protection position.

3. The elevator according to claim 1 wherein the balustrade, when in the first fall protection position, is inclined at an angle of 30° to 80° relative to a horizontal plane.

4. The elevator according to claim 1 including a locking mechanism securing the balustrade in one of the first fall protection position and the second fall protection position.

5. The elevator according to claim 4 wherein the locking mechanism secures the balustrade in the first fall protection position and includes a latch on a stationary counterpart arranged on the car roof, the latch engaging the balustrade.

6. The elevator according to claim 4 wherein the locking mechanism secures the balustrade in the second fall protection position and includes a latch on a stop element arranged on the car roof, the latch engaging the balustrade.

7. The elevator according to claim 4 wherein the locking mechanism secures the balustrade in the second fall protection position and includes a locking notch, the locking notch being on one of the balustrade and a post of a stationary balustrade on the car roof, and a corresponding locking pin unit, the locking pin unit being on another of the balustrade and the post of the stationary balustrade.

8. The elevator according to claim 1 including lateral balustrades arranged on the car roof at perpendicular sides of the car adjoining the side of the car facing toward the counterweight.

9. The elevator according to claim 8 wherein the lateral balustrades are fixedly mounted on the car roof and at least one of the lateral balustrades secures the balustrade in at least one of the first fall protection position and the second fall protection position.

10. The elevator according to claim 1 including at least one connecting rail arranged between the balustrade and a stationary supporting element, the connecting rail being pivotable connected to the balustrade and the supporting element.

11. The elevator according to claim 10 wherein the supporting element is a vertical post on the car roof.

12. The elevator according to claim 10 wherein the at least one connecting rail includes two lever components coupled via a hinge.

13. The elevator according to claim 1 including at least one safety switch or sensor detecting whether the balustrade is in the first fall protection position.

14. A maintenance method for an elevator, the elevator including a car movable in an elevator shaft and a counterweight movable together with the car in the elevator shaft in a direction of movement opposite to a direction of movement of the car, the car having a car roof and the balustrade according to claim 13 arranged on the car roof at a side of the car facing toward the counterweight, the maintenance method comprising the step of:

before starting an inspection run of the car, moving the balustrade from the vertical second fall protection position to the inclined first fall protection position to reduce an accessible area of the car roof.

* * * * *